（12) United States Patent
Boehler et al.

(10) Patent No.: US 9,793,960 B2
(45) Date of Patent: Oct. 17, 2017

(54) NFC APPARATUS CAPABLE TO PERFORM A CONTACTLESS TAG READING FUNCTION

(71) Applicants: STMICROELECTRONICS (ROUSSET) SAS, Rousset (FR); STMICROELECTRONICS APPLICATION GMBH, Ascheim-Dornach (DE)

(72) Inventors: Juergen Boehler, Munich (DE); Alexandre Charles, Auriol (FR)

(73) Assignees: STMicroelectronics (Rousset) SAS, Rousset (FR); STMicroelectronics Application GMBH, Ascheim-Dornach (DE)

( * ) Notice: Subject to any disclaimer, the term of this patent is extended or adjusted under 35 U.S.C. 154(b) by 580 days.

(21) Appl. No.: 13/944,169

(22) Filed: Jul. 17, 2013

(65) Prior Publication Data

US 2014/0022060 A1   Jan. 23, 2014

(30) Foreign Application Priority Data

Jul. 23, 2012 (EP) .................................. 12305895

(51) Int. Cl.
*H04Q 5/22*   (2006.01)
*H04B 5/00*   (2006.01)
(Continued)

(52) U.S. Cl.
CPC ....... *H04B 5/0056* (2013.01); *H04L 63/0492* (2013.01); *H04W 4/008* (2013.01);
(Continued)

(58) Field of Classification Search
CPC ........... G06K 7/10366; G06K 19/0723; G06K 7/0008; G06K 7/10009; G06K 7/10297
(Continued)

(56) References Cited

U.S. PATENT DOCUMENTS 5,142,578 A *   8/1992   Matyas ............... G06F 9/30003
                                                    380/280
7,007,099 B1 *  2/2006   Donati ................. G06F 13/385
                                                    370/229
(Continued)

FOREIGN PATENT DOCUMENTS

WO         2010011055        1/2010

OTHER PUBLICATIONS

Philips Semiconductors, "Highly Integrated ISO14443A Reader IC", Revision 3.2, MF RC500, Dec. 2005, pp. 1-139.
ETSI, "Smart cards; UICC-CLF interface; CLF host controller interface (release 7)", ETSI Draft, European Telecommunications Standards Institute, No. VO.3.), Mar. 2007, pp. 1-78.
(Continued)

*Primary Examiner* — George Bugg
*Assistant Examiner* — Sharmin Akhter
(74) *Attorney, Agent, or Firm* — Slater Matsil, LLP

(57) ABSTRACT

An NFC device may include a first and second controller interfaces, a first communication channel coupled to the first controller interface, and a second communication channel connected to the second controller interface. A secure element may include a secure element interface connected to the first communication channel and encryption/decryption circuitry configured to encrypt data to be sent on the first communication channel for being framed into the encrypted frames and to decrypt encrypted data extracted from the encrypted frames and received from the first communication channel. The secure element may also include management circuitry configured to control the encryption/decryption circuitry for managing the encrypted communication with the NFC controller. A device host may include a host device interface coupled to the second controller interface and control means or circuitry configured to control the management circuitry through non-encrypted commands exchanged on the first and second communication channels.

24 Claims, 4 Drawing Sheets

(51) Int. Cl.
*H04L 29/06* (2006.01)
*H04W 4/00* (2009.01)
*H04W 12/02* (2009.01)
*H04M 1/725* (2006.01)

(52) U.S. Cl.
CPC .......... *H04W 12/02* (2013.01); *H04M 1/7253* (2013.01); *H04M 2250/04* (2013.01)

(58) Field of Classification Search
USPC ................................................ 340/10.1–10.6
See application file for complete search history.

(56) References Cited

U.S. PATENT DOCUMENTS

| | | | |
|---|---|---|---|
| 2012/0011572 A1* | 1/2012 | Chew | H04L 63/0853 726/4 |
| 2014/0244513 A1* | 8/2014 | Ballesteros | G06Q 20/382 705/64 |

OTHER PUBLICATIONS

Reveilhac et al., "Promising secure element alternatives for NFC technology", IEEE, Feb. 2009, pp. 75-80.
NXP Semiconductors, "MIFARE Type Identification Procedure", rev. 3.2, 018432, Aug. 2011, pp. 1-17.
Zilbermann, "Security analysis of contactless payment systels in practice", Ruhr-Universitat Bochum, Nov. 2009, pp. 1-100.
ETSI, TS 102 613, v7.7.0, Smart cards; UICC-contactless front-end (CLF) interface; part 1, Oct. 2009, pp. 1-58.
ETSI, TS 102 622, v11.0.0, Smart cards; UICC-contactless front-end (CLF) interface; host controller interface (HCI), release 11, Sep. 2011, pp. 1-56.
NFC Forum, "NFC Controller Interface (NCI) Specification", Candidate Technical Specification, NCI 1.0, TS-NCI-1.0_candidate-1, Apr. 2012, pp. 1-146.
ETSI, "TR 102 216, v3.0.0, Smart cards; Vocabulary for Smart Card Platform specifications," Sep. 2003, pp. 1-19.

* cited by examiner

NFC APPARATUS CAPABLE TO PERFORM A CONTACTLESS TAG READING FUNCTION

FIELD OF THE INVENTION

The invention relates to the communication between elements, in particular between a NFC contactless tag reader, for example located within a wireless apparatus, such as a mobile phone and a tag, especially when such communication is encrypted according to a proprietary protocol like MIFARE™ and FeliCa™.

BACKGROUND OF THE INVENTION

MIFARE is a registered trademark of NXP B.V. in the U.S. and other jurisdictions, and is used under license. Further to its conventional telephone function, a mobile phone may be used for exchanging information with a contactless device by using a contactless communication protocol. This permits the exchange of information between the contactless device and elements located within the mobile phone. Thus, applications may be developed such as mobile ticketing in public transport (the mobile phone is able to read the content of a boarding pass) or mobile payment (the mobile phone is able to read the actual loaded value on a debit payment card).

Near Field Communication or NFC is a short range high frequency wireless communication technology which enables such exchange of data between two contactless devices over a short distance, for example 10 centimeters. NFC is an open platform technology standardized in ISO/IEC 18092 and ISO/IEC 21481, but incorporates a variety of pre-existing standards including ISO/IEC 14443 protocol type A and type B.

NFC devices have the capability to support, in particular, a reader/writer mode which can be used to read from and write to NFC tags. Among the types of tags selected by the NFC Forum, the tags implementing the MIFARE™ communication protocol and the tags implementing the FeliCa™ communication protocol are noted.

In NFC technology, information is generally transmitted within frames as it is the case, for example, for protocol type A of standard ISO/IEC 14443. However, some communication protocols, for example MIFARE™ and FeliCa™ protocols, also use transmission frames including encrypted bits according to a proprietary encryption algorithm.

Despite the use of such encrypted frames, those protocols remain compatible with existing standards, especially concerning the transmission frames structure. This is, for example, the case for the communication protocol MIFARE™, which remains compatible with standard ISO/IEC 14443. Information about this protocol is disclosed in particular in the document entitled "AN 10 833, MIFARE™ Type Identification Procedure" rev 3. 2, Aug. 29, 2011, 018432 available from of NXP Semiconductors. Other details about this protocol can be found, for example, in the document entitled "Security Analysis of Contactless Payment Systels in practice", Nov. 2, 2009, Ruhr-Universität Bochum by of Michael Zilbermann.

With respect to the FeliCa™ protocol, it conforms to Radio Frequency (RF) technology type F as defined in ISO/IEC 18092. The framing and protocol of this type F technology are also described in Japanese industrial standard JIS X 6319-4. More information regarding the FeliCa™ protocol can be found in technical documents located on the website of the Sony Corporation of Japan.

SUMMARY OF THE INVENTION

According to an embodiment, an enhanced generic architecture for specific NFC device host applications where secure element based cryptographic functions are desired is provided. These functions may be a MIFARE™ classic reader function, a FeliCa™ reader function, and more generally, any reading/writing function where an exchange of encrypted frames between the NFC apparatus may be desirable, for example a mobile phone, acting as a reader/writer, and a tag.

According to an aspect, an NFC apparatus may be capable of performing a contactless tag reading/writing function. The NFC apparatus may include an antenna configured to cooperate with the tag for exchanging encrypted frames with the tag. The NFC apparatus may also include a NFC controller including an emission/reception interface connected to the antenna, a first controller interface, and a second controller interface. The NFC apparatus may further include a first communication channel coupled to the first controller interface and a second communication channel connected to the second controller interface.

The NFC apparatus may also include a secure element including a secure element interface connected to the first communication channel and encryption/decryption means or circuitry configured to encrypt data to be sent on the first communication channel for being framing into the encrypted frames and to decrypt encrypted data extracted from the encrypted frames and received from said first communication channel. The secure element may further include management means or circuitry configured to control the encryption/decryption means or circuitry for managing the encrypted communication with the NFC controller.

The NFC apparatus may also include a device host including a device host interface coupled to the second controller interface. The device host may also include control means or circuitry configured to control the management means or circuitry through non-encrypted commands exchanged on the first and second communication channels.

Thus, according to this aspect, the secure element includes the encryption/decryption means or circuitry (also called "cryptolibrary") and management means or circuitry (also called "terminal application") configured to control the encryption/decryption means or circuitry for managing the encrypted communication with the NFC controller. The control means also called a "terminal interface application", hosted in the device host may provide only a few commands to control the terminal application within the secure element. Thus, there may be less communication traffic via the NFC controller and an increase in transaction time.

The terminal application may manage all ciphered radio frequency (RF) communication with the NFC controller. Each of the first controller interface and secure element interface includes a raw RF gate connected there between by a pipe (logical channel). As indicated in ETSI TS 102 622, a gate is an entry point to a service that is operated inside a host (here the secure element or the NFC controller), and a pipe is a logical communication channel between two gates.

The pipe created between the raw RF gates of the secure element and the NFC controller and carried by the first communication channel, allows the exchange of encrypted RF data between RF tag and the secure element. Encryption nor decryption is performed within the NFC controller. All the encryption/decryption functions may be performed within the secure element and under the control of the management means or circuitry (terminal application). These two gates are called "raw RF gates", because they allow the passage of raw RF data, i.e. encrypted data received from and intended for the RF communication with the tag, without being decrypted.

Further, the first communication channel also allows the exchange of non-encrypted commands between the management means (terminal application) and the control means (terminal interface application) on another logical channel. Thus, according to an embodiment, the first controller interface and the secure element interface are interfaces of the host controller interface (HCI) type, and the first communication channel is a single wire protocol (SWP) physical link carrying two logical channels for respectively carrying the encrypted data and the non-encrypted commands. Preferably, both interfaces of the HCI type are configured to exchange data therebetween by using the simplified high-level data link control (SHDLC) mode, as defined for example in ETSI TS 102 613. As a matter of fact, instead of using a contactless tunneling (CLT) mode, the SHDLC mode allows communication in parallel between the terminal application and the terminal interface application on one hand and between the terminal application and the NFC controller on another hand.

According to an embodiment, the second controller interface and the host device interface are interfaces of the NFC controller interface (NCI) type, and said second communication channel may be a bus of the I²C, universal asynchronous receiver/transmitter (UART), or serial peripheral interface (SPI) types. The secure element may be for example a universal integrated circuit card (UICC) or a secure digital (SD) card removably fixed, or an embedded secure element permanently fixed within the apparatus. As defined within ETSI TR 102 216 V3.0.0 (2003-09), UICC designates a smart card that conforms to the specifications written and maintained by the ETSI Smart Card Platform project.

DETAILED DESCRIPTION OF THE PREFERRED EMBODIMENTS

Figure 1:
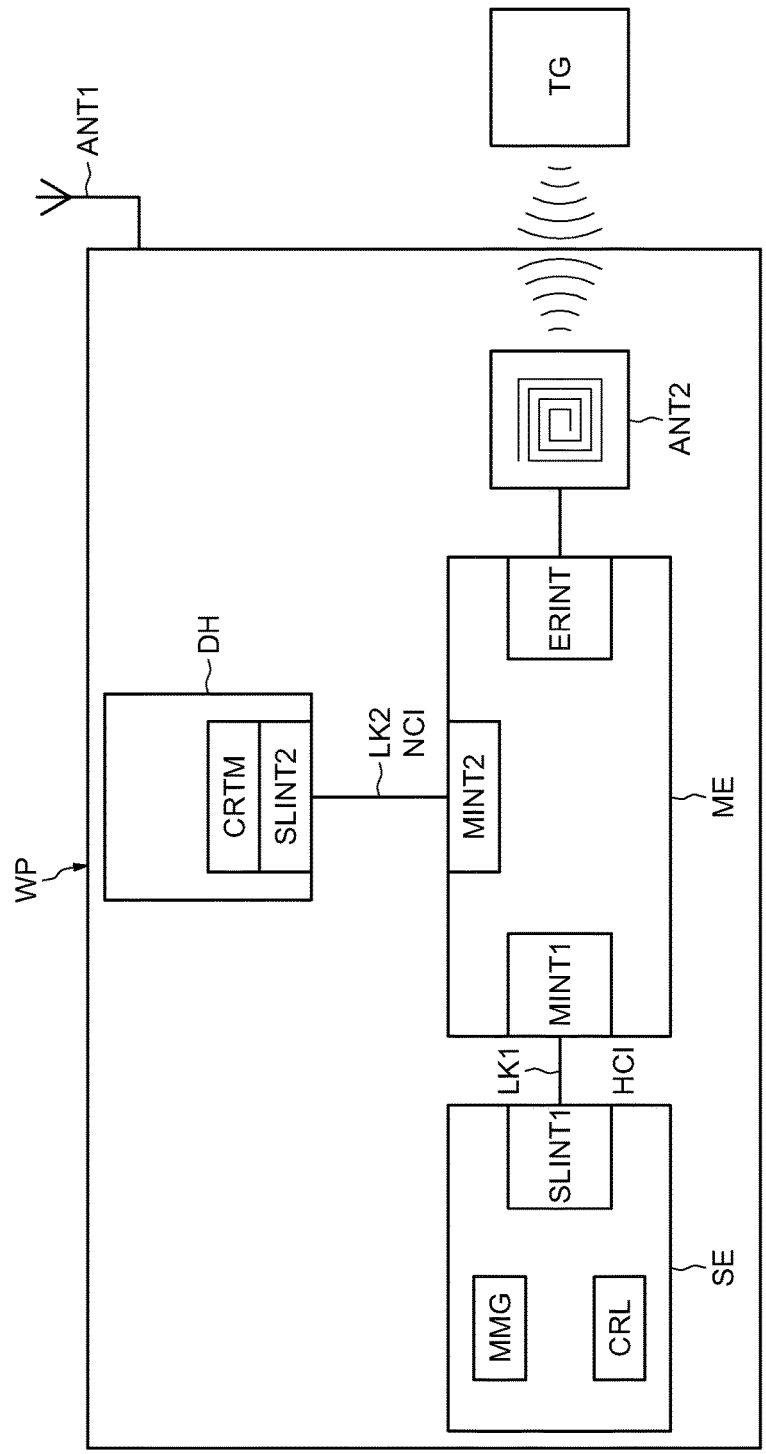
FIG. 1 is a schematic diagram of an embodiment of an apparatus according to the present invention.

FIG. 1 illustrates an NFC apparatus WP, e.g. a NFC mobile phone, provided with an antenna ANT1 for conventional telephone communication. As the apparatus is an NFC apparatus, it further includes a contactless front end element ME, such as an NFC controller, which is responsible for wireless communication, for example radio frequency (RF) communication, with an external RF tag TG through an antenna ANT2.

Encrypted frames are thus exchanged through the antenna ANT2 between the mobile phone WP acting as a reader/writer, and the tag TG. For example, the exchanged frames may be encrypted according to a proprietary encryption algorithm, such as, for example, the MIFARE™ or FeliCa™ encryption algorithms. However, the embodiments are not limited to these particular examples, and may apply to any encrypted frames encrypted according to any kind of encryption algorithm.

The NFC controller ME includes an emission/reception interface ERINT connected to the antenna ANT2, a first controller interface MINT1, and a second controller interface MINT2. The NFC apparatus WP includes also a secure element SE which can be an embedded secure element permanently fixed within the apparatus WP, i.e. without being able to be removed, or a UICC.

The secure element SE includes a secure element interface SLINT1 connected to the first interface MINT1 of the NFC controller by a first communication channel or link LK1. The secure element comprises also encryption/decryption means, or circuitry, or cryptolibrary CRL configured to encrypt data to be sent on the first communication channel LK1 for being framing into the encrypted frames exchanged between the apparatus WP and the tag TG, and to decrypt encrypted data extracted from the encrypted frames and received from the first communication channel LK1.

The secure element SE also includes management means MMG or circuitry called a "terminal application", and configured to control the encryption/decryption means or circuitry for managing the encrypted communication with the NFC controller. The cryptolibrary may be realized by a specific logic circuit, while the management means may be realized by software within a microcontroller.

In the present embodiment, the first communication LK1 is a single wire protocol (SWP) link. SWP is a bit oriented, point-to-point communication protocol between a secure element and a contactless front end, and is specified in the standard ETSI TS 102 613, for example, version V7.7.0 (2009-10) thereof.

Figure 2:
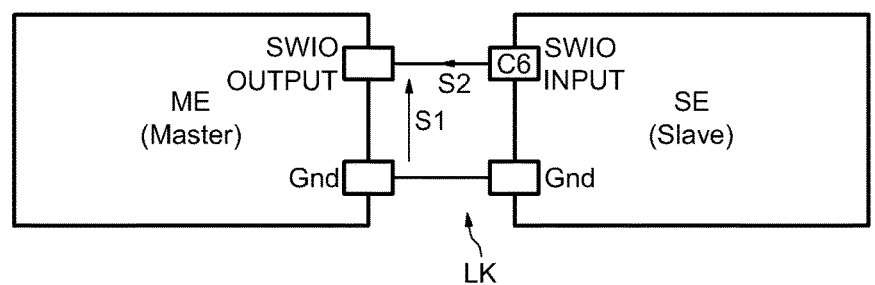
FIG. 2 is a schematic diagram of connections between two elements through an SWP link according to the present invention.

More particularly, as illustrated in FIG. 2, the NFC controller ME is the master whereas the secure element SE is a slave. As disclosed in ETSI TS 102 613, the principle of the SWP is based on the transmission of digital information in a full duplex mode. The signal S1 from ME to SE is transmitted by a digital modulation (L or H) in the voltage domain, whereas the signal S2 from SE to ME is transmitted by a digital modulation (L or H) in the current domain.

When the master sends S1 as state H, then the slave may either draw a current (state H) or not (state L), and thus transmits S2. With pulse width modulation bit coding of S1, it is possible to transmit a transmission clock, as well as data in full duplex mode. More details can be found in ETSI TS 102 613.

Figure 3:
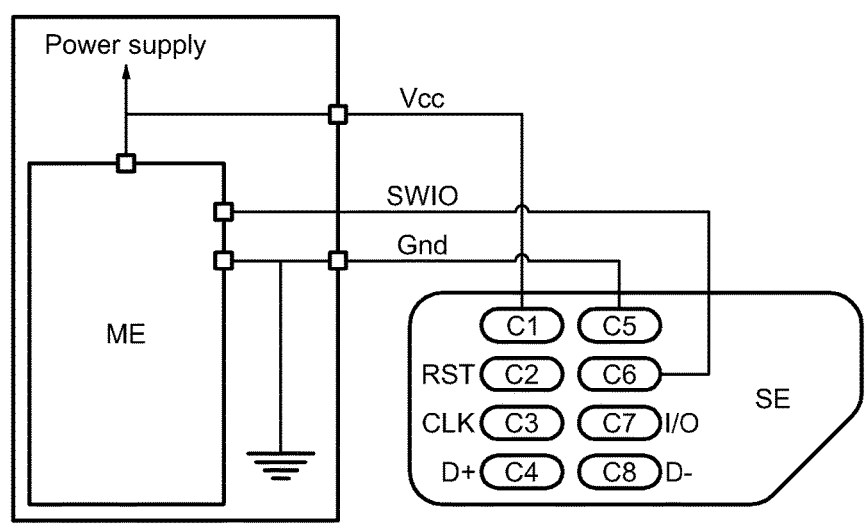
FIG. 3 is another schematic diagram of connection between two elements through an SWP link according to the present invention.

FIG. 3 illustrates an embodiment of the physical link between the contactless element ME and the secure element SE. More particularly, as illustrated in FIG. 3 and explained in ETSI TS 102 613, the contact C6 of the secure element is connected to the port SWIG of the contactless element ME for transmission of signal S1 and S2.

The SWP link uses the HCI as disclosed within ETSI TS 102 613 and ETSI TS 102 622. In other words, the NFC controller interface MINT1 and the secure element interface SLINT1 are interfaces of the HCI type.

As indicated in ETSI TS 102 622, for example version 11.00 (2011-09), the HCI defines the interface between the NFC controller and the secure element. More specifically, the HCI has three levels: a collection of gates that exchange commands, responses and events, an HCP (Host Controller Protocol) messaging mechanism, and an HCP routine mechanism that may optionally segment messages when desired.

The HCP typically requires that the underlying data link layer (e.g. SWP) be error-free and that the order of the received/sent data shall be respected. As explained in ETSI TS 102 613, the logical link control (LLC) layer manages error management and flow control while the medium access control (MAC) layer manages framing on the SWP link LK1. Among the three LC layers defined in ETSI TS 102 613, reference is made to the LLC layer called simplified high level data link control (SHDLC) LLC and the contactless tunnelling (CLT) LLC.

In fact, as will be explained in further detail below, the SWP link LK1 carries two logical channels (or pipes) for respectively carrying encrypted data coming from and intended for RF communication with the tag and non-encrypted commands exchanged between the management means (terminal application) and control means (terminal interface application) lodged in the device host DH, for example a microprocessor. Although it would be possible for both interfaces SLINT1 and MINT1 to use the CLT mode, it may be preferable that these interfaces use the SHDLC mode to allow parallel communication between terminal application and terminal interface application for exchanging non-encrypted commands, and a communication between terminal application and NFC controller for exchanging encrypted data.

As a matter of fact, the SHDLC mode defines logical channel identification mechanism: each message starts with a header. In this header a PipeID defined at pipe creation provides an identification communication channel (Pipe). Then messages on different pipes can be interleaved without any limitation. The CLT mode does not propose such header with a PipeId feature.

Turning now to the device host DH, as previously explained, it includes control means CRTM or circuitry configured to control the management means MMG through non-encrypted commands. The device host DH further includes a device host interface SLINT2 coupled to the second controller interface MINT2 by a second communication channel LK2. The second controller interface MINT2 and the device host interface SLINT2 are preferably interfaces of the NFC Controller Interface (NCI) type. The NCI communication protocol between an NFC controller and a device host is, for example, described in the document entitled "NFC Forum-TS-NCI-1.0_candidate_1, Apr. 12, 2012".

The second communication channel LK2 may be, for example, a bus of the I$^2$C, UART, or SPI type. The control means CRTM is also responsible for managing a user input.

Figure 4:
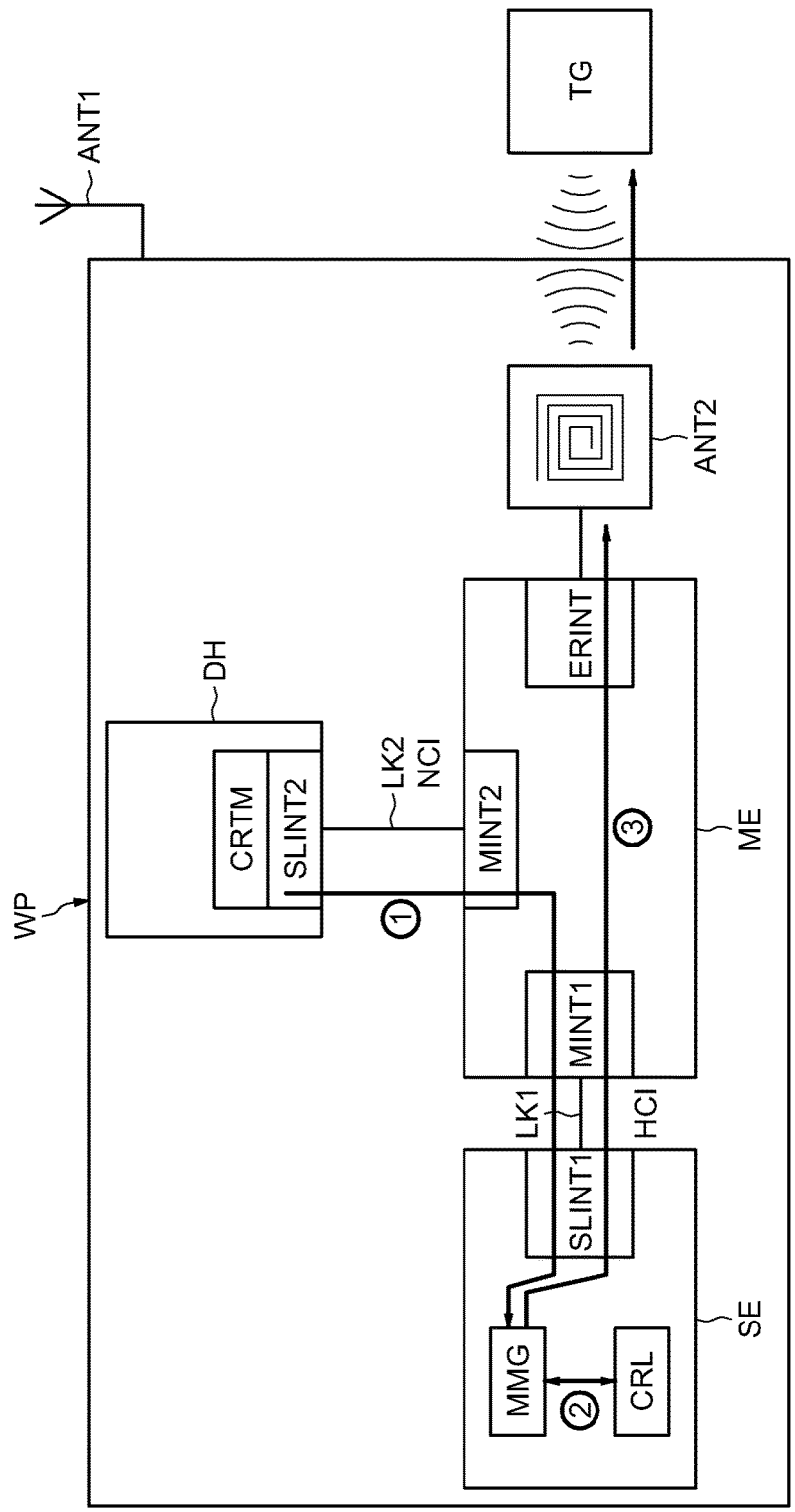
FIG. 4 is a schematic diagram of operation of the apparatus of FIG. 1.
Figure 5:
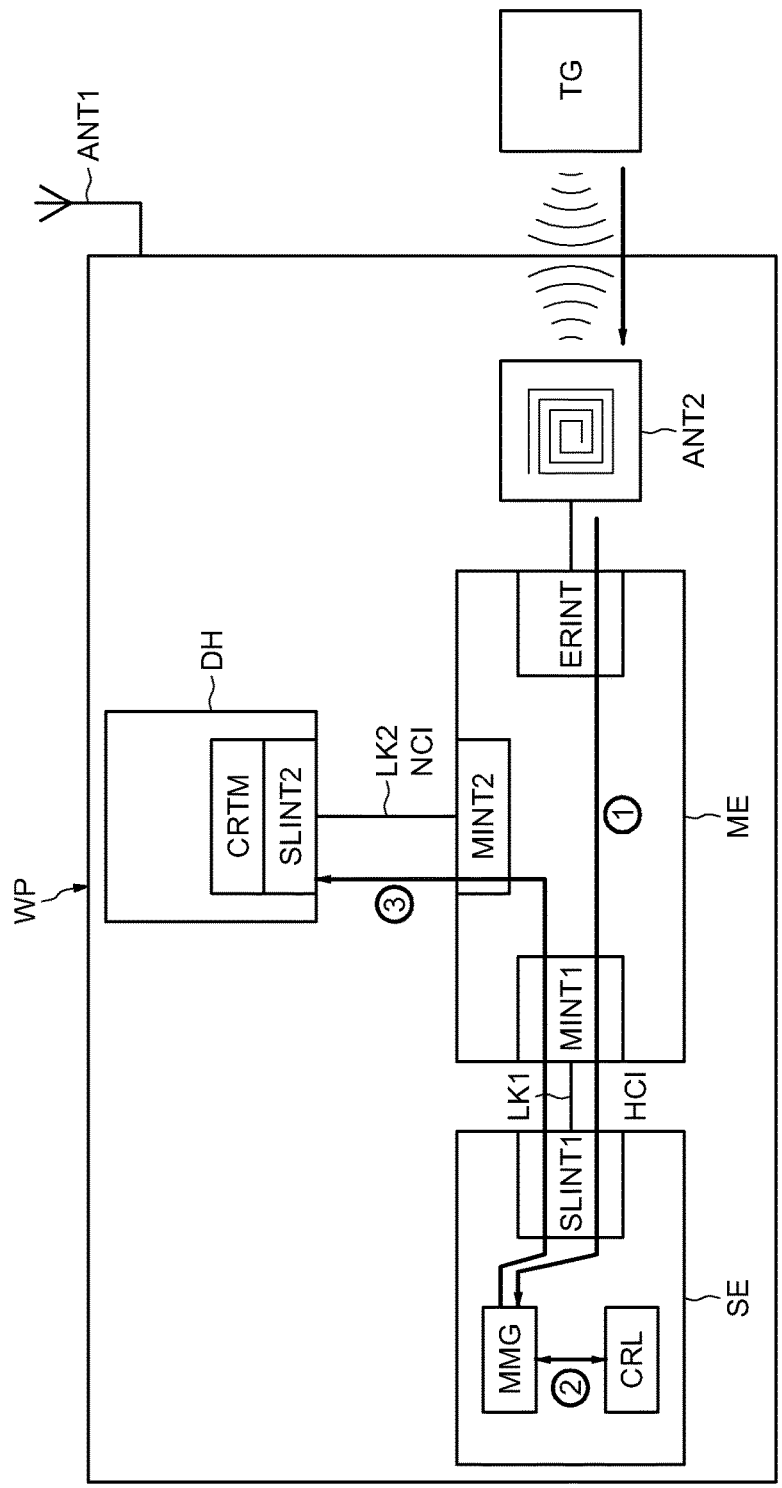
FIG. 5 is another schematic diagram of operation of the apparatus of FIG. 1

Referring now more specifically to FIGS. 4 and 5, operation of the tag reader/writer WP is now explained. When the mobile phone WP wants to write the tag TG (FIG. 4), non-encrypted commands are sent① by the control means CRTM of the device host DH to the management means MMG of the secure element through the interface SLINT2, the link LK2, the interface MINT2, the interface MINT1, the link LK1, and the interface SLINT1.

The management means, which may be considered an equivalent to a command interpreter, manage③ the encryption means CRL in the cryptolibrary to encrypt data and eventually parity bits to be sent to the tag TG. The encryption bits are then transmitted③ to the NFC controller ME through the interface SLINT1, the link LK1, and the interface MINT1. The encrypted bits are then framed into frames corresponding to the communication protocol by the NFC controller and then sent to the tag TG through antenna NT2.

When the mobile phone wants to read the tag TG (FIG. 5), the encrypted frames are read① from the tag through antenna ANT2 by the NFC controller ME. Then, the raw encrypted data are then extracted from the frames and are transmitted① to the secure element SE through the link LK1. The management means MMG control② the decryption means for decrypting the received encrypted data and also verifying the parity bits. Information corresponding to these decrypted received data and including commands is transmitted③ to the control means CRTM of the device host DH through the links LK1 and LK2.

It should be noted that such architecture, in which the terminal application (management means MMG) are hosted in the secure element for directly controlling the cryptolibrary, is an enhanced architecture permitting improved data flow, transaction time, and security with respect to another architecture in which the terminal application would be hosted in the device host.

As a matter of fact, with another architecture, it may be necessary to provide the device host with a crypto interface. Further, the terminal application uses a crypto interface to de/encrypt the communication with the tag and as a cryptolibrary is placed in the embedded secure element, the cryptolibrary has to establish a connection via the NFC controller and a HCI pipe for data de/encryption, rendering such another architecture not optimal in terms of data flow, transaction time, and security.

In some communication protocols, for example, in the MIFARE™ communication, the parity bits are calculated from plain text and then these calculated parity bits are encrypted. More particularly, the parity bit associated to the byte N can be encrypted with the same key bit as the one used for encrypting the first bit of the following byte N+1.

Thus, in such a case, the NFC controller receiving the encrypted data and encrypted parity bits from the secure element generally must not calculate parity bits according to ISO/IEC 14443. The NFC controller only takes the encrypted information received from the secure element and frames this information into frames corresponding to ISO/IEC 14443.

In reception, the encrypted data and encrypted parity bits received from the tag by the NFC controller into frames are extracted from the frames without checking the parity bits and then transmitted on the link LK1 to the secure element to be decrypted. The check of the parity bits is made in the secure element.

That which is claimed is:

1. A near field communication (NFC) apparatus comprising:
   a device host comprising a host controller and a host interface;
   an NFC antenna configured to communicate with an external radio-frequency (RF) device;
   an NFC controller comprising a first NFC controller interface coupled to the NFC antenna, a second NFC controller interface coupled to the host interface, and a third NFC controller interface; and
   a secure element comprising a secure element interface coupled to the third NFC controller interface;
   wherein, during a write operation, the NFC apparatus is configured to:
     transmit unencrypted data from the host interface to the second NFC controller interface,
     transmit unencrypted data from the third NFC controller interface to the secure element interface, encrypt, by the secure element, the unencrypted data received by the secure element interface from the third NFC controller interface together with parity bits to form a first encrypted data, transmit the first encrypted data from the secure element interface to the third NFC controller interface, frame into frames the first encrypted data by the NFC controller, and transmit the frames of the first encrypted data from the first NFC controller interface to the RF device via the NFC antenna.

2. The NFC apparatus of claim 1, wherein, during a read operation, the NFC apparatus is further configured to:

receive, by the first NFC controller interface, encrypted frames of a second encrypted data from the RF device via the NFC antenna, the second encrypted data comprising encrypted parity bits;

extract the second encrypted data from the received frames by the NFC controller;

transmit the second encrypted data from the third NFC controller interface to the secure element interface;

decrypt, by the secure element, the second encrypted data to form a first unencrypted data and a first unencrypted parity bits;

verify, by the secure element, the first unencrypted parity bits;

transmit the first unencrypted data from the secure element interface to the third NFC controller interface; and transmit the first unencrypted data from the second NFC controller interface to the host interface.

3. The NFC apparatus of claim 1, wherein transmission of data between the third NFC controller interface and the secure element interface comprises transmitting data using a single wire protocol (SWP) physical link.

4. The NFC apparatus of claim 1, wherein the third NFC controller interface and the secure element interface are interfaces configured to exchange data using a simplified high-level data link control (SHDLC) mode.

5. The NFC apparatus of claim 1, wherein transmission of data between the host interface and second NFC controller interface comprises transmission of data using an inter-integrated circuit bus (I²C), a universal asynchronous receiver/transmitter (UART) bus, or a serial peripheral interface bus (SPI).

6. The NFC apparatus of claim 1, wherein the RF device comprises an RF tag.

7. The NFC apparatus of claim 1, further comprising:
a housing carrying the NFC antenna and the NFC controller; and
a telecommunications antenna carried by the housing.

8. The NFC apparatus of claim 1, wherein the NFC controller is configured to frame data into frames corresponding to ISO/IEC 14443.

9. The NFC apparatus of claim 1, wherein the secure element encrypts data according to MIFARE™ or Felica™ encryption algorithms.

10. The NFC apparatus of claim 1, wherein the secure element is implemented in a universal integrated circuit card (UICC).

11. A near field communication (NFC) apparatus comprising:
a device host comprising a host controller and a host interface;
an NFC antenna configured to communicate with an external radio-frequency (RF) device;
an NFC controller comprising a first NFC controller interface coupled to the NFC antenna, a second NFC controller interface coupled to the host interface, and a third NFC controller interface; and
a secure element comprising a secure element interface coupled to the third NFC controller interface;
wherein the NFC apparatus is configured to
receive, by the first NFC controller interface, encrypted frames of a second encrypted data from the RF device via the NFC antenna, the second encrypted data comprising encrypted parity bits;
extract the second encrypted data from the received frames by the NFC controller;
transmit the second encrypted data from the third NFC controller interface to the secure element interface;
decrypt, by the secure element, the second encrypted data to form a first unencrypted data and a first unencrypted parity bits;
verify, by the secure element, the first unencrypted parity bits;
transmit the first unencrypted data from the secure element interface to the third NFC controller interface; and
transmit the first unencrypted data from the second NFC controller interface to the host interface.

12. The NFC apparatus of claim 11, wherein transmission of data between the third NFC controller interface and the secure element interface comprises transmission of data using a single wire protocol (SWP) physical link.

13. The NFC apparatus of claim 11, wherein the third NFC controller interface and the secure element interface comprise interfaces configured to exchange data using a simplified high-level data link control (SHDLC) mode.

14. The NFC apparatus of claim 11, wherein transmission of data between the host interface and second NFC controller interface comprises transmission of data using an inter-integrated circuit bus (I²C), a universal asynchronous receiver/transmitter (UART) bus, or a serial peripheral interface bus (SPI).

15. The NFC apparatus of claim 11, wherein the RF device comprises an RF tag.

16. The NFC apparatus of claim 11, further comprising:
a housing carrying the NFC antenna and the NFC controller; and
a telecommunications antenna carried by the housing.

17. The NFC apparatus of claim 11, wherein the secure element is implemented in a universal integrated circuit card (UICC).

18. A method of communicating with a near field communication (NFC) tag, the method comprising:
transmitting unencrypted data from a host interface of a device host to a second NFC controller interface of an NFC controller;
transmitting unencrypted data from a third NFC controller interface to a secure element interface;
encrypting, using a secure element, the unencrypted data received by the secure element interface from the third NFC controller interface together with parity bits to form a first encrypted data,
transmitting the first encrypted data from the secure element interface to the third NFC controller interface;
framing into frames the first encrypted data using the NFC controller; and
transmitting the frames of the first encrypted data from a first NFC controller interface to the NFC tag via an NFC antenna.

19. The method of claim 18, further comprising:
receiving, using the first NFC controller interface, encrypted frames of a second encrypted data from the NFC tag via the NFC antenna, the second encrypted data comprising encrypted parity bits;
extracting, using the NFC controller, the second encrypted data from the received frames;
transmitting the second encrypted data from the third NFC controller interface to the secure element interface;
decrypting, using the secure element, the second encrypted data to form a first unencrypted data and a first unencrypted parity bits;
verifying, using the secure element, the first unencrypted parity bits;
transmitting the first unencrypted data from the secure element interface to the third NFC controller interface; and
transmitting the first unencrypted data from the second NFC controller interface to the host interface.

20. The method of claim 18, wherein encrypting data using the secure element comprises encrypting data according to MIFARE™ or Felica™ encryption algorithms.

21. A method of communicating with a near field communication (NFC) tag, the method comprising:
receiving, using a first NFC controller interface of an NFC controller, encrypted frames of a second encrypted data from the NFC tag via an NFC antenna, the second encrypted data comprising encrypted parity bits;
extracting, using the NFC controller, the second encrypted data from the received frames;
transmitting the second encrypted data from a third NFC controller interface of the NFC controller to a secure element interface of a secure element;
decrypting, using the secure element, the second encrypted data to form a first unencrypted data and a first unencrypted parity bits;
verifying, using the secure element, the first unencrypted parity bits;
transmitting the first unencrypted data from the secure element interface to the third NFC controller interface; and
transmitting the first unencrypted data from a second NFC controller interface of the NFC controller to a host interface of a host controller.

22. The method of claim 21, wherein transmission of data between the third NFC controller interface and the secure element interface comprises transmission of data using a single wire protocol (SWP) physical link.

23. The method of claim 21, wherein the third NFC controller interface and the secure element interface comprise interfaces configured to exchange data using a simplified high-level data link control (SHDLC) mode.

24. The method of claim 21, wherein transmission of data between the host interface and second NFC controller interface comprises transmission of data using an inter-integrated circuit bus (I²C), a universal asynchronous receiver/transmitter (UART) bus, or a serial peripheral interface bus (SPI).

* * * * *